(12) United States Patent
Fischer et al.

(10) Patent No.: US 6,575,113 B1
(45) Date of Patent: Jun. 10, 2003

(54) COOLED JET BLAST DEFLECTORS FOR AIRCRAFT CARRIER FLIGHT DECKS

(75) Inventors: Eugene C. Fischer, Stevensville, MD (US); Dale A. Sowell, Severna Park, MD (US); John Wehrle, Greenbelt, MD (US); Peter O. Cervenka, Rockville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/146,453

(22) Filed: May 16, 2002

(Under 37 CFR 1.47)

(51) Int. Cl.⁷ .................................................. B63B 35/44
(52) U.S. Cl. ........................................................ 114/261
(58) Field of Search .......................................... 114/261

(56) References Cited

U.S. PATENT DOCUMENTS 4,325,317 A  *  4/1982  Wilford ...................... 114/261

* cited by examiner

*Primary Examiner*—Jesus D. Sotelo
(74) *Attorney, Agent, or Firm*—Jacob Shuster

(57) ABSTRACT

Jet blast deflector panels hinged to the deck of an aircraft carrier are pivotally displaced through mechanical actuators to raised angular positions for deflecting exhaust plumes from jet propelled aircraft during take-off to protect closely spaced approaching aircraft which are to take-off thereafter in front of the deflector panels. The underside surface of each deflector panel is formed from a thermal insulating material to provide thermal protection from heating by impinging jet exhaust plumes, and is subsequently cooled by blasts of fluid or air beneath the deck when the deflector panel is in its lowered retracted position.

6 Claims, 2 Drawing Sheets

COOLED JET BLAST DEFLECTORS FOR AIRCRAFT CARRIER FLIGHT DECKS

STATEMENT OF GOVERNMENT INTEREST

The invention described herein may be manufactured and used by or for the Government of the United States of America for governmental purposes without the payment of any royalties thereon or therefore.

The present invention relates generally to deflection of exhaust plumes from jet propelled aircraft during take-off on the flight deck of an aircraft carrier vessel.

BACKGROUND OF THE INVENTION

The decks of aircraft carriers are presently equipped with jet blast deflectors which function to dissipate jet exhaust of aircraft undergoing catapult launch. Such deflectors undergo cooling by waterlines which impose significant corrosion and burdensome maintenance problems as well as to complicate constructional design and increase costs associated therewith. Additional operational and aging problems for the equipment involved are presently introduced because of the higher temperatures and flow speeds of exhaust plumes from new attack jet aircraft, such as a minimum of 2300° F. temperature and 1800 feet per second exhaust flow at the jet blast deflector. It is therefore an important object of the present invention to reduce the constructional complications and costs associated with jet blast deflectors, while preserving or improving the thermal protective attributes associated therewith.

SUMMARY OF THE INVENTION

In accordance with the present invention, each of the jet blast deflectors is formed with a bottom blast-side made of a thermal insulation layer, a top side layer coated with non-slip deck material and intermediate high temperature reinforced layers therebetween to form flat deflector panels hinged to the deck for pivotal displacement between raised positions in which jet exhaust plumes impinge on the bottom blast-side layers and lower positions in which cooling air flow blasts are applied thereto beneath the deck. Pivotal displacement of the jet blast deflector panels is effected under remote control through mechanical actuators to accommodate aircraft landing, take-off and closer approach of the aircraft to the take-off locations before preceding aircraft launches.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
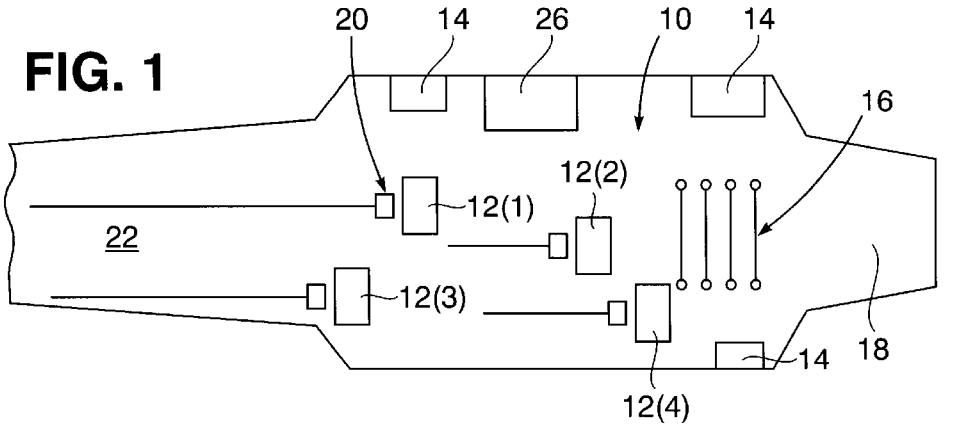
FIG. 1 is a simplified top plan view of an aircraft carrier flight deck, with jet blast deflectors disposed thereon in retracted positions.
Figure 4:
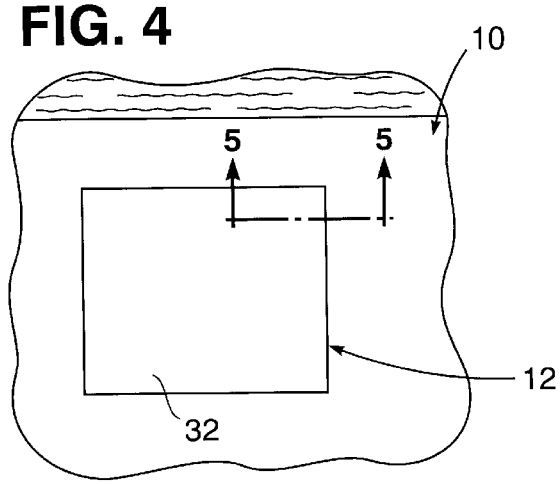
FIG. 4 is a partial top plan view corresponding to that of FIG. 3, showing the jet blast deflector in its retracted position.
Figure 5:
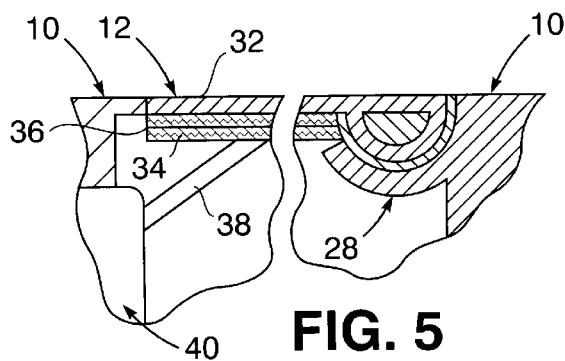
FIG. 5 is a partial section view taken substantially through plane indicated by section line 5—5 in FIG. 4.
Figure 5A:
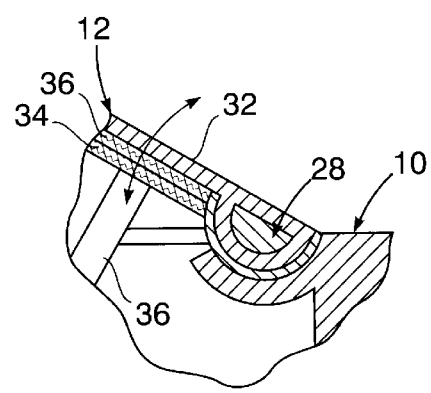
FIG. 5A is a partial section view corresponding to a portion of the section view shown in FIG. 5, with the jet blast deflector being angularly displaced from its retracted position toward the gas deflecting position shown in FIG. 2.

Referring now to the drawing in detail, FIG. 1 illustrates a typical aircraft carrier deck, generally referred to by reference numeral 10. Four jet blast deflectors $12_1$, $12_2$, $12_3$ and $12_4$ are shown positioned on the deck 10 between elevators 14 on opposite sides thereof, and rearwardly spaced from an assembly 16 of landing wires and arresting gear located adjacent to the aft end portion 18 of the deck 10. Catapults 20 extend forwardly from each of the jet blast deflectors 12 toward the forward end portion 22 of the deck 10. Landing of aircraft on the deck 10 with the jet blast deflectors 12 in their retracted condition as shown in FIGS. 4 and 5, is already well known in the art wherein the aircraft move along the surface of the deck 12 in the take-off direction from the aft end portion 18 toward the forward end portion 22. Pursuant to the present invention, aircraft take-off launch of jet propelled aircraft 24 occurs adjacent to one of the deflectors 12 after its upward displacement, to a deflecting position as shown in FIG. 2, under observation control exercised from a carrier island tower 26 on one side of the deck 10 as shown in FIG. 1.

Figure 2:
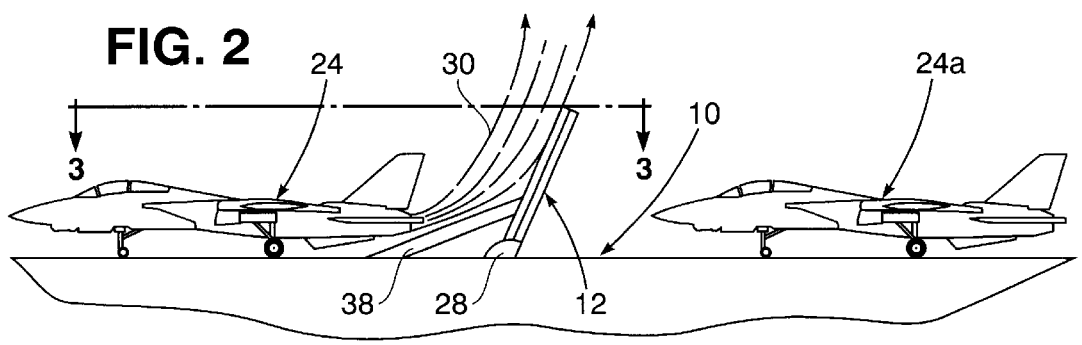
FIG. 2 is a partial side elevation view of a portion of the flight deck of an aircraft carrier vessel in seawater as illustrated in FIG. 1, with one of the jet blast deflectors shown in a gas deflecting position between a forwardly located aircraft during take-off and a rearwardly located aircraft awaiting takeoff.
Figure 3:
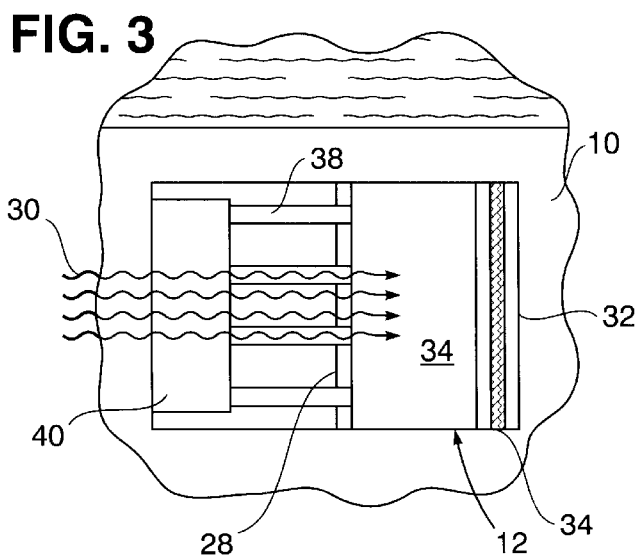
FIG. 3 is a partial top plan view of a portion of the carrier flight deck, as viewed from section line 3—3 in FIG. 2.

With continued reference to FIG. 2 and to FIGS. 3, 4, 5 and 5A, the constructional arrangement and operational attributes associated with each of the jet blast deflectors 12 is apparent. A generally rectangular flat panel type of jet blast deflector 12 is pivotally connected to the deck 10 by a hinge 28 so as to be raised to the deflecting position as shown in FIG. 2 at an angle of 130° from the surface of the deck 10 rearwardly of the aircraft 24 prior to take-off. The deflector 12 will accordingly deflect the jet exhaust plumes 30 from the rear end of the aircraft 24 upwardly during take-off launch to prevent the exhaust plumes from reaching an approaching jet aircraft 24a. The deflector 12 is lowered to its position flush with the deck surface, as shown in FIGS. 1 and 5, so as to accommodate movement of the approaching aircraft 24a to the take-off launch position in front of the deflector 12 as well as to accommodate conventional landing of aircraft as aforementioned. Raising and lowering of each of the deflectors 12 is effected through advanced lifting apparatus as hereinafter described, avoiding use of hydraulic devices subject to heating problems. Furthermore, in view of the heating problem produced by the jet exhaust plumes of aircraft during take-off launch, cooling of the deflectors 12 while in their retracted positions is performed below the surface of the deck 10 without use of waterlines.

Referring now to FIGS. 2, 3, 4, 5 and 5A, each of the deflectors 12 has a top metallic layer 32 made or coated with non-slip deck surface material. A bottom underside layer 34 of the deflector 12 is made of a thermal insulating material, while an intermediate substrate layer 34 is provided between the top and bottom layers 32 and 34 to establish a predetermined generally uniform flat panel thickness for the deflector 12. The thermal insulating bottom layer 34 of the deflector panel heated by impingement of the jet exhaust plumes of aircraft during take-off, is thereafter cooled beneath the deck 10 by blasts of cold air on an appropriately cooled fluid.

As shown in FIGS. 2, 3, 5 and 5A, reversible lifting and lowering apparatus for each of the deflector panels includes a plurality of elongated lift actuator mechanisms 38 connected to the underside of the deflector panel 12 at its hinge 28. Such lift actuator mechanisms 38 extend into a remotely controlled type of mechanically powered mechanism 40, well known in the prior art, through which deflector movement is effected.

It will be apparent from the foregoing description that the top of each of the deflectors 12 formed by its non-slip layer 32 is protected from excessive heating in response to impingement of jet blast plumes by the thermal insulating bottom layer 34 on which such jet exhaust impingement occurs during aircraft take-off, followed by its ambient air flow cooling confined beneath the carrier deck 12. Subsequently approaching jet aircraft may accordingly safely roll over such cooled deflector 12 to a take-off location.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a deck of an aircraft carrier from which jet propelled aircraft take-off, jet blast deflector means pivotally mounted on said deck for deflecting jet exhaust plumes from the aircraft during said take-off; and means for cooling of the deflector means following said take-off of the aircraft; said deflector means including: a panel having an underside surface layer made of thermal insulating material on which the jet exhaust plumes impinge during said take-off of the aircraft and a top surface layer made of a non-slip material corresponding to that of the deck.

2. The combination as defined in claim 1, further including: non-hydraulic means for pivotally displacing the deflector means in reversible directions between a retracted position with the top surface layer flush with the deck and a raised position exposing the underside surface layer to the jet exhaust plumes impinging thereon.

3. The combination as defined in claim 2, wherein said non-hydraulic means includes: elongated actuators connected to the underside surface layer of the deflector means and extending therefrom beneath the deck.

4. The combination as defined in claim 3, wherein cooling of the deflector means is performed beneath the deck, with the underside surface layer of the deflector means in the retracted position by said means for cooling which includes application of cooling blasts of fluid to said undersurface layer.

5. The combination as defined in claim 4, wherein said fluid applied is air.

6. The combination as defined in claim 1, wherein cooling of the deflector means is performed beneath the deck on the underside surface of the deflector means by said cooling means which includes application of blasts of cooling fluid.

* * * * *